(No Model.) 2 Sheets—Sheet 1.

P. MANHES.
CONVERTER FOR COPPER ORES.

No. 470,644. Patented Mar. 8, 1892.

Witnesses
Chas. H. Smith
W. L. Serrell

Inventor
Pierre Manhes
per Lemuel W. Serrell
Atty (No Model.) 2 Sheets—Sheet 2.

P. MANHES.
CONVERTER FOR COPPER ORES

No. 470,644. Patented Mar. 8, 1892.

UNITED STATES PATENT OFFICE.

PIERRE MANHES, OF LYONS, FRANCE.

CONVERTER FOR COPPER ORES.

SPECIFICATION forming part of Letters Patent No. 470,644, dated March 8, 1892.

Application filed December 2, 1885. Serial No. 184,408. (No model.) Patented in England October 13, 1883, No. 4,886.

*To all whom it may concern:*

Be it known that I, PIERRE MANHES, of Lyons, in the Republic of France, have invented an Improvement in the Process of Treating Copper Matte in Converters, (for which I have received a patent in Great Britain, No. 4,886, bearing date October 13, 1883,) of which the following is a specification.

The improvements to which my present invention relate were patented in Great Britain as a communication from me October 13, 1883, No. 4,886.

Converters have heretofore been made in which the blast enters through one of the trunnions and passes by a pipe to an air-belt around the lower part of the converter, and from this air-belt tuyeres or orifices pass through the lining of the converter, and in some instances openings have been provided in the outer wall of the air-belt, into which pieces of glass have been inserted and sometimes movable screw-cap pieces have been applied. In the conversion of iron into steel the air acting upon the carbon increases the heat of the mass in the converter; but when copper matte is introduced into the converter the action of the air upon the same is to burn out the impurities and separate the copper; but this copper speedily becomes chilled by the action of the air, and the tuyeres or blast-holes become obstructed, and the operation of the converter is thereby delayed on account of an insufficient supply of air.

My invention relates to the method or process pursued in treating the copper matte for its conversion into metallic copper; and it consists in driving into the melted mass within the converter from time to time the copper which becomes chilled at the end of the tuyeres, so that the blast is maintained in full force and the rapidity of the operation greatly promoted.

In carrying out my invention I provide a converter substantially as shown in the accompanying drawings, in which—

Figure 1:
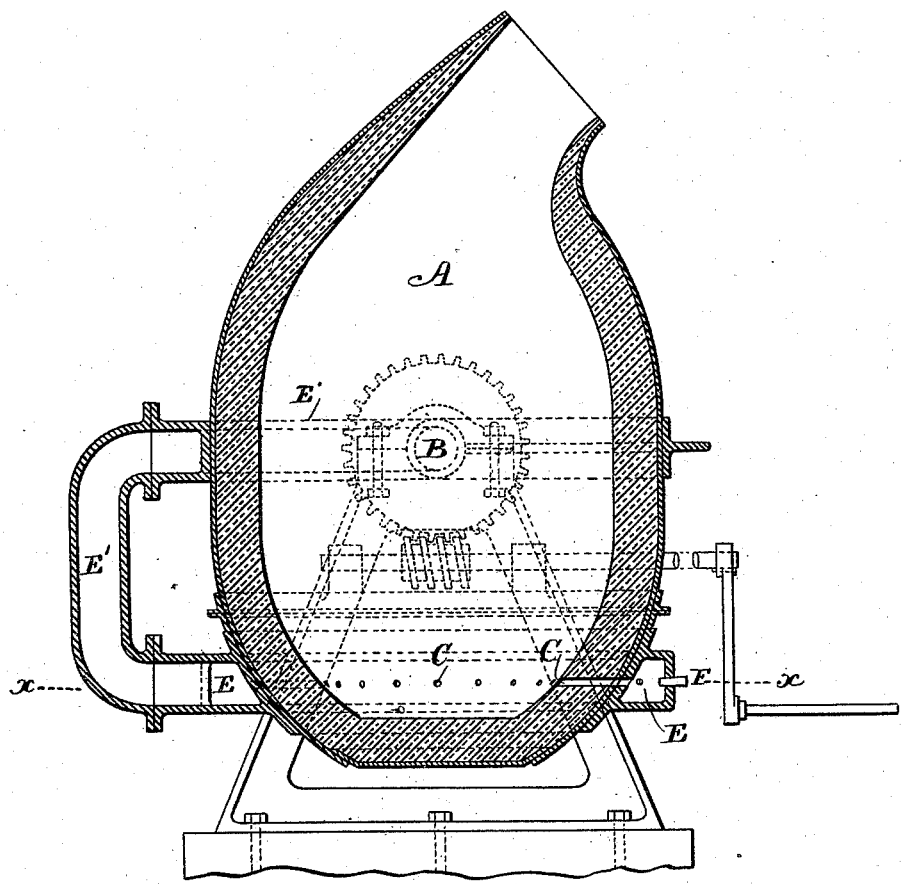
Figure 2:
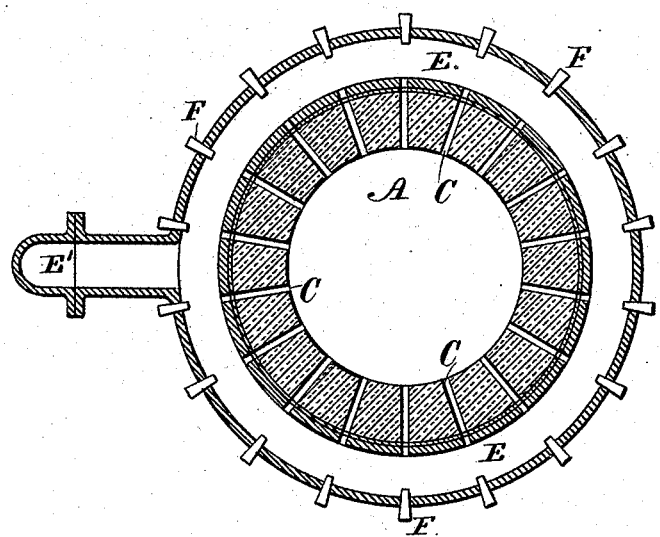

Figure 1 is a vertical section of the converter, and Fig. 2 is a horizontal plan through the air-belt at the line *x x*.

The converter A is of ordinary size and shape, and it is supported by the trunnions B in suitable frames, and the air is supplied through one of the trunnions and the pipe E' to the air-belt E, that surrounds the lower part of the converter, and these are tuyere-holes or openings C from the air-belt through the case and lining of the converter. In the outer wall of the air-belt there are openings with removable plugs F, which openings are opposite to and in line with the tuyere-holes C. These tuyere-holes C may be all around the converter or only one side, according to the shape or character of the converter. After the copper matte in a melted condition has been supplied into the converter the blast is applied and the converter rotated in such a manner that the blast will pass into the matte for the purpose of burning out the foreign substances and reducing the matte to copper, and the attendant from time to time removes the plugs F in succession to ascertain whether the tuyere-holes C are open and the blast passing freely into the matte. If there is any obstruction an iron bar about the size of the tuyere-hole is entered and driven through the tuyere to break away and carry into the mass of matte and copper the chilled metal that has accumulated around the inner end of the tuyere, thereby opening up the tuyeres whenever necessary for securing the full action of the blast.

I am aware that provision has been made for clearing the blast-holes in blast-furnaces; but this apparatus is not adapted to the conversion of copper matte, and my process renders the operation of converting copper matte practicable and efficient, whereas the efforts to reduce copper matte in converters have heretofore failed in consequence of the blast-holes becoming obstructed.

I claim as my invention—

1. The process of reducing commercial or pig copper from copper matte, consisting in charging the matte in a molten state into a converter, forcing radial jets of air uniformly and continuously through the charge of molten matte and causing the heat produced by the combustion of the sulphur and iron in the matte to separate the foreign substance from the metallic copper contained therein, allowing the metallic copper as it is separated from the matte to settle below the action of the air-jets and removing the chilled metallic copper as it forms around and obstructs the inner ends of the tuyeres, and thereby insure the maintenance of a continuous and practically uniform distribution of air throughout the molten matte, and continuing the operation until the metallic copper contained in the charge has been separated therefrom and then removing the copper from the converter, substantially as set forth.

2. A converter for reducing commercial or pig copper from copper matte, having a wind-belt encircling the converter above its bottom, a series of tuyeres extending through the lining of the converter and communicating at their outer ends with the wind-belt, and removable stoppers located in the outer wall of the wind-belt and in alignment with each one of said tuyeres, whereby a drift-bar may be inserted successively through said tuyeres to remove obstructions from their inner ends, substantially as set forth.

Signed by me this 14th day of November, A. D. 1885.

PIERRE MANHES.

Witnesses:
LOUIS JUBIER,
LFPRICETTS JULES.